United States Patent
Sandoval (10) Patent No.: US 11,088,714 B2
(45) Date of Patent: Aug. 10, 2021

(54) SYSTEMS AND METHODS FOR SELECTING A COMMUNICATION CHANNEL

(71) Applicant: Allosense, Inc., San Antonio, TX (US)

(72) Inventor: Roman Sandoval, San Antonio, TX (US)

(73) Assignee: Allosense, Inc., San Antonio, TX (US)

( * ) Notice: Subject to any disclaimer, the term of this patent is extended or adjusted under 35 U.S.C. 154(b) by 0 days.

(21) Appl. No.: 17/120,090

(22) Filed: Dec. 11, 2020

(65) Prior Publication Data

US 2021/0184702 A1 Jun. 17, 2021

Related U.S. Application Data

(60) Provisional application No. 62/947,539, filed on Dec. 12, 2019.

(51) Int. Cl.
| | |
|---|---|
| *H04B 1/00* | (2006.01) |
| *H04L 12/863* | (2013.01) |
| *H04L 27/34* | (2006.01) |
| *H04W 72/12* | (2009.01) |
| *H04L 27/00* | (2006.01) |
| *H04W 40/02* | (2009.01) |

(52) U.S. Cl.
CPC ........... *H04B 1/0003* (2013.01); *H04L 27/34* (2013.01); *H04L 47/50* (2013.01); *H04W 72/1242* (2013.01); *H04L 2027/0057* (2013.01); *H04W 40/02* (2013.01)

(58) Field of Classification Search
None
See application file for complete search history.

(56) References Cited

U.S. PATENT DOCUMENTS

| | | | | |
|---|---|---|---|---|
| 2004/0066754 A1* | 4/2004 | Hottinen | ............... | H04B 7/0615 370/252 |
| 2006/0015674 A1* | 1/2006 | Murotake | ............. | G06F 9/4401 711/101 |
| 2010/0234063 A1* | 9/2010 | Mueck | .................. | H04W 48/12 455/552.1 |
| 2014/0370927 A1* | 12/2014 | Sun | ........................ | H04W 12/08 455/518 |
| 2017/0034707 A1* | 2/2017 | Green | .................... | H04W 16/10 |
| 2018/0152848 A1* | 5/2018 | Egner | ..................... | H04W 76/15 |
| 2018/0160441 A1* | 6/2018 | Egner | ............... | H04W 72/1231 |
| 2018/0167825 A1* | 6/2018 | Egner | ..................... | H04W 28/08 |
| 2019/0150080 A1* | 5/2019 | Davies | .............. | H04W 28/0236 370/329 |
| 2020/0107338 A1* | 4/2020 | Egner | ............... | H04W 72/1215 |

\* cited by examiner

*Primary Examiner* — Bob A Phunkulh
(74) *Attorney, Agent, or Firm* — Shah IP Law, PLLC (57) ABSTRACT

A method and system of transmitting data. The method comprises receiving data, in a memory of the server computing device, from an asset tracker device; determining, in a processor of the server computing device, one or more weighting factors representing a respective priority associated with one or more of a latency, a cost, a power utilization and a throughput associated with transmission of the data for each of a plurality of communication channels; and selecting, from the plurality of communication channels, a communication channel for transmission of the data based at least in part on the one or more weighting factors and a transmission schedule for the data.

22 Claims, 7 Drawing Sheets

SYSTEMS AND METHODS FOR SELECTING A COMMUNICATION CHANNEL

CROSS-REFERENCE TO RELATED APPLICATIONS

This application claims the benefit of priority to U.S. Provisional Patent Application No. 62/947,539 filed Dec. 12, 2019. Said U.S. Provisional Patent Application No. 62/947,539 is incorporated by reference in the entirety herein.

BACKGROUND

Field of the Art

This disclosure relates generally to communications and more specifically to selecting an appropriate communication channel.

Discussion of the State of the Art

Internet of Things (IoT) devices may be used to gather data about an environment and provide feedback to a user remotely. Often, IoT devices need to be "always connected," providing constant data from one or more associated sensors to a cloud computing environment using a particular communication channel. The remote user may retrieve data provided from the IoT devices from the cloud computing environment. However, network conditions may make the particular communication channel less desirable than another communication channel. What is needed is a way to dynamically compare communication channels and select a particular communication channel for a particular message.

SUMMARY

The present invention utilizes systems and/or methods for selecting a communication channel. The systems and/or methods described herein, in accordance with an embodiment of the invention, automatically cause a message to be transmitted via a selected communication channel. The systems and/or methods described herein may receive a communication request. The systems and/or methods may perform a preliminary analysis of the communication request. The systems and/or methods may retrieve one or more factors (e.g., costs, latency, throughput, power usage, etc.), and, based on the preliminary analysis, the systems and/or methods may apply particular weights to the one or more retrieved factors to create an algorithm. The systems and/or methods may use the algorithm to select a communication path. The systems and/or methods may select a radio and/or modulation/demodulation profile associated with the selected communication path.

For example, an Internet of Things (IoT) device may be placed in a field of crops. The IoT device may comprise one or more sensors for detecting data relevant for crops (e.g., temperature, humidity, etc.) The IoT device may transmit a request to make detected data available to a remote user to a communication system, such as a server or a satellite in direct communication with the IoT device. The communication system may receive the request and perform preliminary analysis on the request. The preliminary analysis may determine that the request is not urgent.

The communication system may be configured to communicate via a first communication channel. The first communication channel may comprise a cellular channel. In one embodiment, the communication system may comprise a cellular radio. In one embodiment, the communication system may comprise a software-defined radio (SDR) comprising a cellular setting. In one embodiment, the cellular setting may comprise of an SDR personality that is compiled in a bitfile on the SDR's FPGA. However, the cellular setting may be compiled in other ways, as would be readily apparent to a person of ordinary skill in the art. The communication system may be configured to communicate via a second communication channel. The second communication channel may comprise satellite channel. In one embodiment, the communication system may comprise a satellite radio. In one embodiment, the communication system may comprise an SDR comprising a satellite setting.

The communication system may retrieve real-time and/or near real-time values associated with cost, latency, throughput, and power consumption for at least two communication channels from one or more lookup tables. Because the communication system determined that the request is not urgent, the communication system may assign coefficients with lower priorities to values associated with speed at which the request is delivered (e.g., latency, throughput, etc.) and coefficients with higher priorities to other values (e.g., cost, power consumption, etc.). The communication system may select the cellular channel based on the values from the one or more lookup tables and the preliminary analysis of the request. The communication system may cause a cellular radio to be turned on. The communication system may prepare the data in a message receivable by the cellular channel. The communication system may cause the prepared message to be transmitted from the cellular radio to a server accessible by a remote user via the cellular channel.

One benefit of the present invention is that data received from IoT devices may be sent cost efficiently when appropriate, and time efficiently when needed. This reduces the cost it takes to transmit data when situations permit the data to be sent without urgency. This also reduces the time it takes to transmit data when urgency is needed.

Provided is a method, performed in a server computing device, of transmitting data. The method comprises receiving data, in a memory of the server computing device, from an asset tracker device; determining, in a processor of the server computing device, one or more weighting factors representing a respective priority associated with one or more of a latency, a cost, a power utilization and a throughput associated with transmission of the data for each of a plurality of communication channels; and selecting, from the plurality of communication channels, a communication channel for transmission of the data based at least in part on the one or more weighting factors and a transmission schedule for the data.

In one embodiment, the method further comprises switching on the selected communication channel and transmitting the data, in accordance with the selected communication channel, to at least one of: the asset tracker, an intermediary computing device associated with the asset tracker, and a communication satellite.

In one aspect, switching on the selected communication channel comprises transitioning a software-defined radio (SDR) associated with the selected communication channel from a first configuration into a second configuration.

In another aspect, the method further comprises, prior to transmitting the data, performing an in-phase and quadrature phase (IQ) modulation operation in conjunction with IQ modulation digital to analog converters in association with the selected communication channel.

In one embodiment, the data transmission schedule is based at least in part on one or more of latency and data throughput information of each of the plurality of communication channels.

In one variation, the weighting factor associated with the latency is based at least in part upon a transmission distance associated with a location along an expected path of the asset tracker and an expected time of delivery of the data transmission.

In another aspect, the weighting factor associated with the power utilization is based at least in part upon power consumption, as measured or estimated, of respective ones of the plurality of communication channels.

In another embodiment, the power utilization of at least one of the plurality of communication channels comprises power required to transition a software-defined radio (SDR) from a first configuration into a second configuration.

In another variation, the method further comprises, prior to transmitting the data, queuing the data and transmitting the data upon toggling from the selected channel to a higher-cost communication channel when a queue length results in a predetermined threshold value of unacceptable latency cost associated with the queuing.

In another embodiment, the selected communication channel enables transmission of the data between the asset tracker and the server computing device via at least one of: one or more cellular communication providers and one or more satellite communication providers.

Also provided is a server computing device comprising a processor and a memory. The memory includes instructions which, when executed in the processor causing operations comprising: receiving data, in a memory of the server computing device, from an asset tracker device; determining, in a processor of the server computing device, one or more weighting factors representing a respective priority associated with one or more of a latency, a cost, a power utilization and a throughput associated with transmission of the data for each of a plurality of communication channels; and selecting, from the plurality of communication channels, a communication channel for transmission of the data based at least in part on the one or more weighting factors and a transmission schedule for the data.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The inventive systems and methods (hereinafter sometimes referred to more simply as "system" or "method") described herein significantly reduce the time and/or cost it takes to transmit data from a remote sensor to a user. Specifically, the system receives a communication request. The system performs preliminary analysis of the received request. The system determines one or more weighting factors related to two or more available communication channels. The system selects a communication channel from the available communication channels based on the preliminary analysis performed and the determined one or more weighting factors. The system prepares a message including the data in accordance with the communication request for transmission via the selected communication channel. The system causes the message to be transmitted via the selected communication channel.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Figure 1:
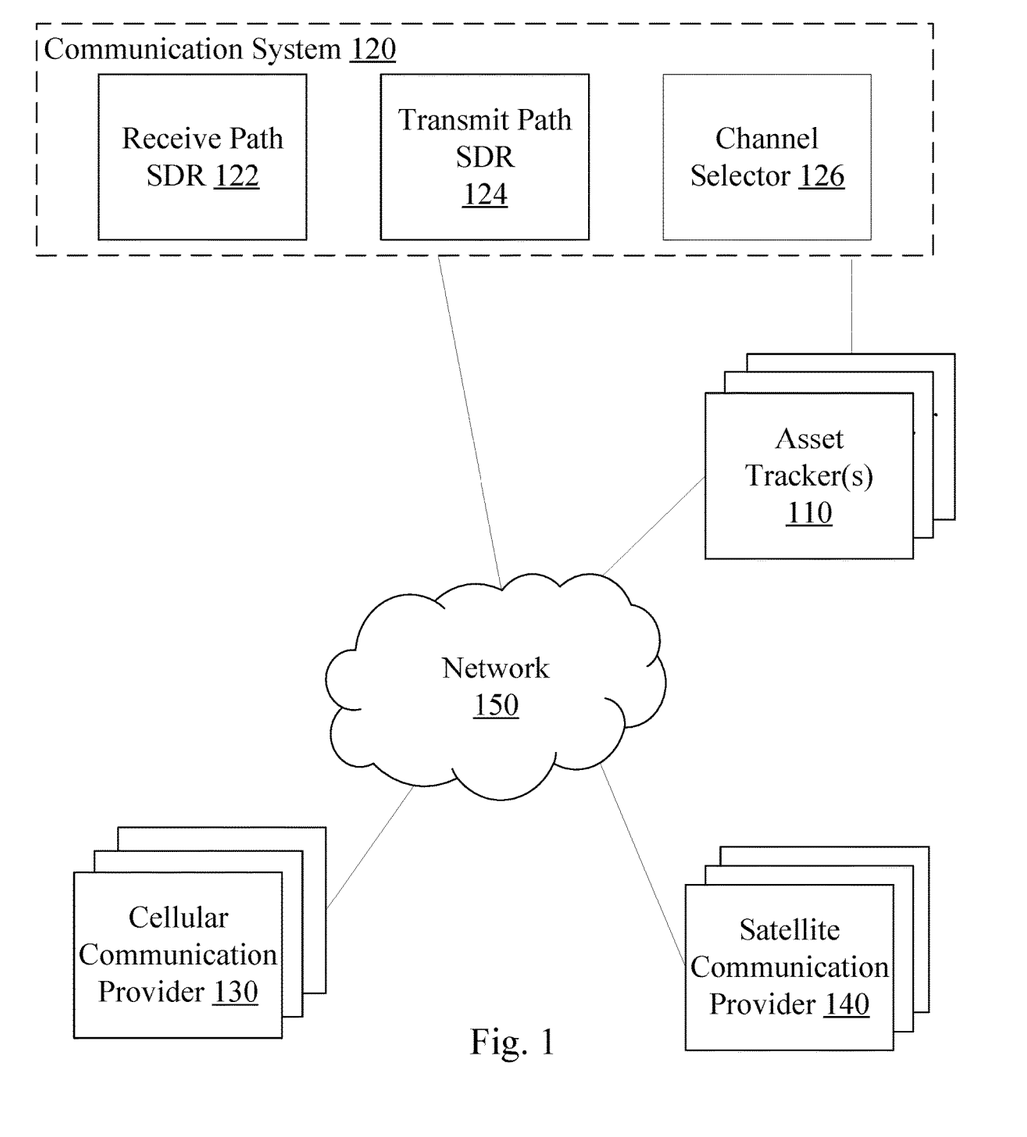
FIG. 1 illustrates a system for selecting an appropriate communication channel with an exemplary embodiment of the invention.

FIG. 1 illustrates a system for selecting a communication channel with an exemplary embodiment of the invention. The system may comprise one or more asset tracker(s) 110, a communication system 120, one or more cellular communication provider(s) 130, one or more satellite communication provider(s) 140, and a network 150 over which various systems communicate and interact. The communication system 120 may comprise one or more radios, such as a cellular receiver, a cellular transmitter, a cellular transceiver, a satellite receiver, a satellite transmitter, a satellite transceiver, a receive path software-defined radio (SDR) 122, a transmit path SDR 124, and the like. The communication system 120 may comprise a channel selector 126. The channel selector 126 will be described in greater detail in FIG. 2 below; however, generally, the channel selector 126 selects a radio and/or a configuration for a radio via which a message is sent. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The one or more asset tracker(s) 110 may comprise one or more sensors to collect data relevant to a tracked asset. The one or more asset tracker(s) 110 may provide the collected data to one or more remote user(s). The one or more asset tracker(s) 110 may comprise an Internet of Things (IoT) device. For clarity, the term asset tracker or asset tracker device as used herein includes IoT devices, and also distributed sensors such as may be deployed in a data acquisition and communication network. An IoT device as referred to herein includes a machine that can (1) sense (2) compute, and (3) communicatively connect. The communication system 120 may comprise one or more radios, such as a cellular receiver, a cellular transmitter, a cellular transceiver, a satellite receiver, a satellite transmitter, a satellite transceiver, a receive path software-defined radio (SDR) 122, a transmit path SDR 124 (which may further include a loopback path (TX→RX that may be used for calibration and real-time performance analysis of generated RF waveforms in, for example, baseband, IF, and/or RF paths), and the like. In one embodiment of the invention, the communication system 120 may be embodied in an asset tracker 110. In another embodiment, the asset tracker 110 may use a variety of communication systems/methodologies/architecture that are described herein and/or may be known to a person of ordinary skill in the art. In such instances, the asset tracker 110 may optimize a communication methodology based on one or more of the following: cost, speed, throughput, etc., as described in greater detail below.

The communication system 120 may be in direct communication with the one or more asset tracker(s) 110. The communication system 120 may comprise a computing device. The communication system 120 may comprise a satellite. The communication system 120 may be integrated with the one or more asset tracker(s) 110 into a single device. In an embodiment, the communication system 120 may receive communication requests from the one or more asset tracker(s) 110 and return communication channel instructions to the one or more asset tracker(s) 110. In an embodiment, the communication system 120 may act as an intermediary device for the one or more asset tracker(s) 110 and forward data received from the one or more asset tracker(s) 110 via a selected communication channel.

The one or more cellular communication provider(s) 130 may comprise Global System for Mobile (GSM) service, General Packet Radio Service (GPRS) service, Third Generation (3G) service, Long Term Evolution (LTE) service, Fourth Generation (4G) service, Fifth Generation (5G) service, any other type of cellular service, and/or any combination of the foregoing. The one or more cellular communication provider(s) 130 may provide cellular communication to devices associated with subscribers. Each of the one or more cellular communication provider(s) 130 may use a particular set of security protocols to protect messages transmitted via an associated cellular communication link.

The one or more satellite communication provider(s) 140 may provide satellite communication to devices associated with subscribers. Each of the one or more satellite communication provider(s) 140 may use a particular set of security protocols to protect messages transmitted via an associated satellite communication link.

The various computing devices disclosed herein may be embodied in various computing devices (herein referred to as user input device, user device, or client device) including functionality for communicating (e.g., remotely) over a network 150. Various computing devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

The network 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
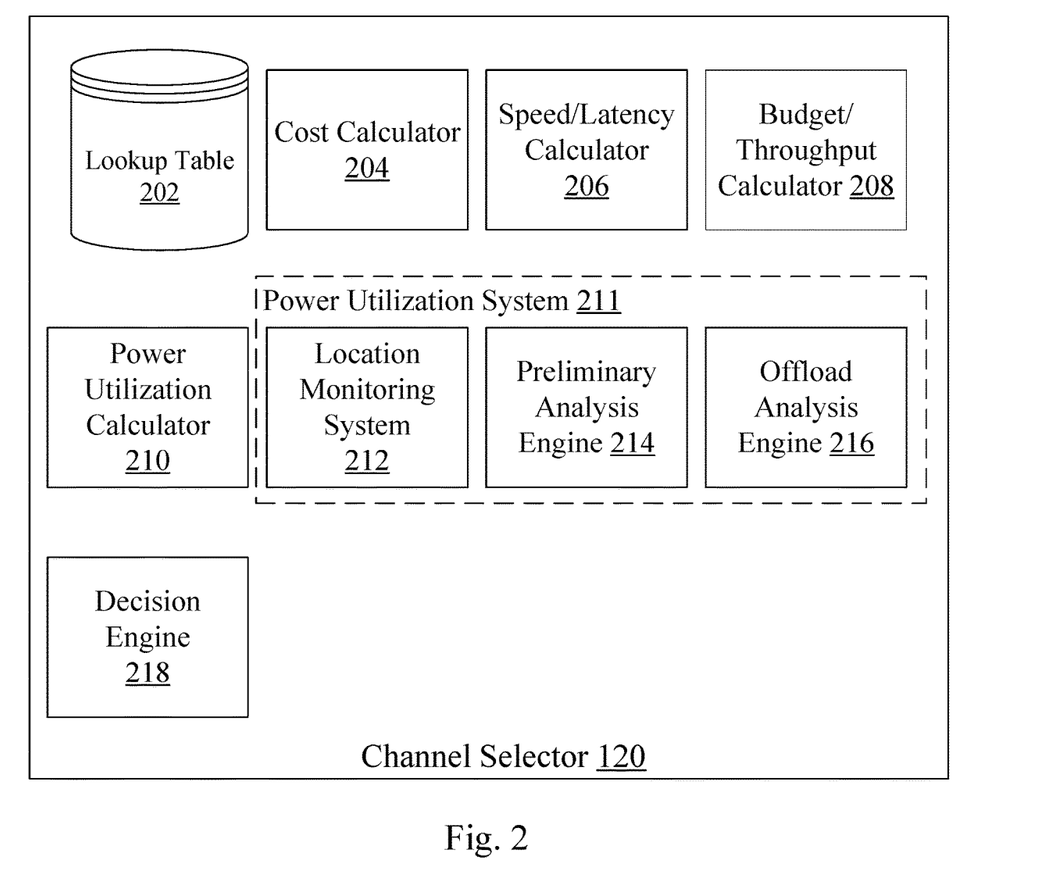
FIG. 2 illustrates an implementation of the channel selector in accordance with an embodiment of the invention.

FIG. 2 illustrates an implementation of the communication channel selecting system in accordance with an embodiment of the invention. The channel selector 126 selects a communication channel based on current conditions and an analysis of a message to be transmitted. The channel selector 126 may comprise a lookup table 202, a cost calculator 204, a speed and/or latency calculator 206, a budget and/or throughput calculator 208, a power utilization calculator 210, a power utilization system 211, and a decision engine 218. Other systems and databases may be used, as would be readily understood by a person of ordinary skill in the art, without departing from the scope of the invention.

The lookup table 202 may comprise real-time and/or near real-time data relevant to selecting a communication channel. The lookup table 202 may comprise cost information associated with each communication channel option. The lookup table 202 may comprise service information associated with each communication channel option. Service information may comprise latency (e.g., speed, etc.) and/or throughput (e.g., budget, etc.) information. The lookup table 202 may comprise power usage information.

The cost calculator 204 may calculate a cost associated with each communication channel. The cost calculator 204 may use information from the lookup table 202 to calculate a cost associated with each communication channel. Cost may be based, at least in part, on a byte-wise price set by a subscription contract with a service provider, such as one of the one or more cellular communication provider(s) 130 in FIG. 1 or one of the one or more satellite communication provider(s) 140 in FIG. 1. The cost calculator 204 may provide a calculated cost associated with each communication channel to the decision engine 218.

The speed and/or latency calculator 206 may calculate a latency associated with each communication channel. The speed and/or latency calculator 206 may use information from the lookup table 202 to calculate a latency associated with each communication channel. Latency may be based, at least in part, on a relevant distance. The relevant distance may comprise a distance between components of a provider's system, such as a distance between a satellite and a ground station for one of the one or more satellite communication provider(s) 140 in FIG. 1. The relevant distance may comprise a distance between the communication system 120 in FIG. 1 or one of the one or more asset tracker(s) 110 in FIG. 1 and a component of a provider's system, such as a distance between one of the one or more asset tracker(s) 110 in FIG. 1 and a cellular tower of one of the one or more cellular communication provider(s) 130 in FIG. 1. The relevant distance may comprise a distance between the communication system 120 in FIG. 1 and one of the one or more asset tracker(s) 110 in FIG. 1. The speed and/or latency calculator 206 may provide a calculated latency associated with each communication channel to the decision engine 218.

The budget and/or throughput calculator 208 may calculate a throughput associated with each communication channel. The budget and/or throughput calculator 208 may use information from the lookup table 202 to calculate a throughput associated with each communication channel. Throughput for a particular communication channel may be based, at least in part, on an instantaneous bandwidth associated with the particular communication channel. The budget and/or throughput calculator 208 may provide a calculated throughput associated with each communication channel to the decision engine 218.

The power utilization calculator 210 may calculate a power usage associated with each communication channel. The power utilization calculator 210 may use information from the lookup table 202 to calculate a power usage associated with each communication channel. The power utilization calculator 210 may use information from the power utilization system 211 to calculate a power usage associated with each communication channel. Power usage for a particular communication channel may be based, at least in part, on a power usage of a radio associated with the particular communication channel. Power usage for a particular communication channel may be based, at least in part, on a power needed to transition a software-defined radio (SDR) from a first configuration into a second configuration associated with the particular communication channel. The power utilization calculator 210 may provide the calculated power usage associated with each communication channel to the decision engine 218.

The power utilization system 211 may comprise components monitored for power usage. The power utilization system 211 may comprise the location monitoring system 212, the preliminary analysis engine 214, and the offload analysis engine 216. The power utilization system 211 may update the lookup table 202 with power usage information.

The power utilization system 211 may provide power usage information to the power utilization calculator 210. In embodiments, power consumption associated with one or more individual communication channels may be derived based on actual measurements of power consumed, a computation of the power consumed, or a simulation result pertaining to power consumed.

The location monitoring system 212 may maintain location information needed to calculate latency. The location information needed to calculate latency may comprise satellite location information, cellular tower location information, asset tracker location information, intermediary computing device location information, etc. The location monitoring system 212 may update the lookup table 202 with location information. The location monitoring system 212 may provide location information to the speed and/or latency calculator 206.

The preliminary analysis engine 214 may analyze a communication request from one of the one or more asset tracker(s) 110 in FIG. 1. The communication request may comprise a request to transmit data from the one of the one or more asset tracker(s) 110 in FIG. 1 to a computing device accessible by a user. The preliminary analysis engine 214 may determine information about the data. For example, the preliminary analysis engine 214 may determine if the data comprises urgent information, how much bandwidth the data needs, if it makes sense to store all the data for a 24-hour period and send it in one batch, etc. Based on the determinations, the preliminary analysis engine 214 may determine a priority associated with each of the cost, latency, throughput, and power usage associated with transmitting the data. Based on the determined priorities, the preliminary analysis engine 214 may assign a gain (e.g., coefficient, weight, factor, etc.) to each of the cost, latency, throughput, and power usage. The preliminary analysis engine 214 may comprise and/or be in communication with an artificial intelligence engine that improves the performance of the preliminary analysis engine 214 based on historical data associated with performance of the channel selector 126. The artificial intelligence engine may be comprised of a training system and an analysis system. The training and/or analysis may be performed on a batched dataset and/or in real-time as incoming analysis requests are made, as would be apparent to a person of ordinary skill in the art. In one instance, the artificial intelligence engine may be used to identify and omit invalid outlier data which may be an artifact from noise, temperature, uncalibrated sensors, and/or poor absolute accuracy on sensors and/or asset trackers 110. In one instance, the artificial intelligence engine may apply predictive analytics to determine when an asset tracker 110 should be serviced, and/or replaced. The artificial intelligence system may be used to identify areas with minimal and/or inconsistent coverage (i.e. "dead spots") based on historical training data. The artificial intelligence engine may also determine expected paths of an asset tracker 110 based on historical training data. For example, if an asset tracker 110 moves from one location to the next, the algorithm can predict the expected path and segment the time series data into sessions/routes for the customer to see. Then the route can be superimposed on a real-time map, showing the customer the expected path and time of delivery. In one variation, the weighting factor associated with the latency is based at least partly upon the transmission distance associated with a location along the predicted or expected path of the asset tracker in conjunction with an expected time of delivery of the data transmission.

SDR transition usage engine (not shown) may determine a power usage for a particular communication channel associated with changing a configuration of an SDR from a current configuration into a configuration associated with the particular communication channel. The SDR transition usage engine may update the lookup table 202 with power usage information. The SDR transition usage engine may provide power usage information to the power utilization calculator 210.

The offload analysis engine 216 may schedule data for transmission. The offload analysis engine 216 may determine which data may be queued for later transmission and which data should be transmitted immediately. The offload analysis engine 216 may use the priorities determined by the preliminary analysis engine 214 in making determinations regarding data transmission order. The offload analysis engine 216 may schedule a set of data for batch transmission. The offload analysis engine 216 may base the data transmission schedule, at least in part, on latency and/or throughput information of the communication channel options.

The decision engine 218 may select a communication channel for transmitting data received from an asset tracker. The decision engine 218 may select the communication channel based on the determined cost, latency, throughput, and power usage of each communication channel, and based on the associated gains assigned based on the determined data priority. The decision engine 218 may apply the gains received from the preliminary analysis engine 214. The decision engine 218 may assign a gain to each of the cost, latency, throughput, and power usage based on priorities received from the preliminary analysis engine 214. The decision engine 218 may select the communication channel based on a transmission schedule of the offload analysis engine 216. The decision engine 218 may cause a signal indicative of the selected communication channel to be transmitted to an asset tracker which initiated a communication request. The decision engine 218 may cause a signal indicative of the selected communication channel to be transmitted to an intermediary computing device associated with an asset tracker which initiated a communication request. The decision engine 218 may cause a signal indicative of the selected communication channel to be transmitted to a satellite. The decision engine 218 may cause a selected communication channel radio to be turned on and an unselected communication channel radio to be turned off. The decision engine 218 may cause a configuration of one or more SDR radios to be changed to a setting associated with the selected communication channel.

Figure 3:
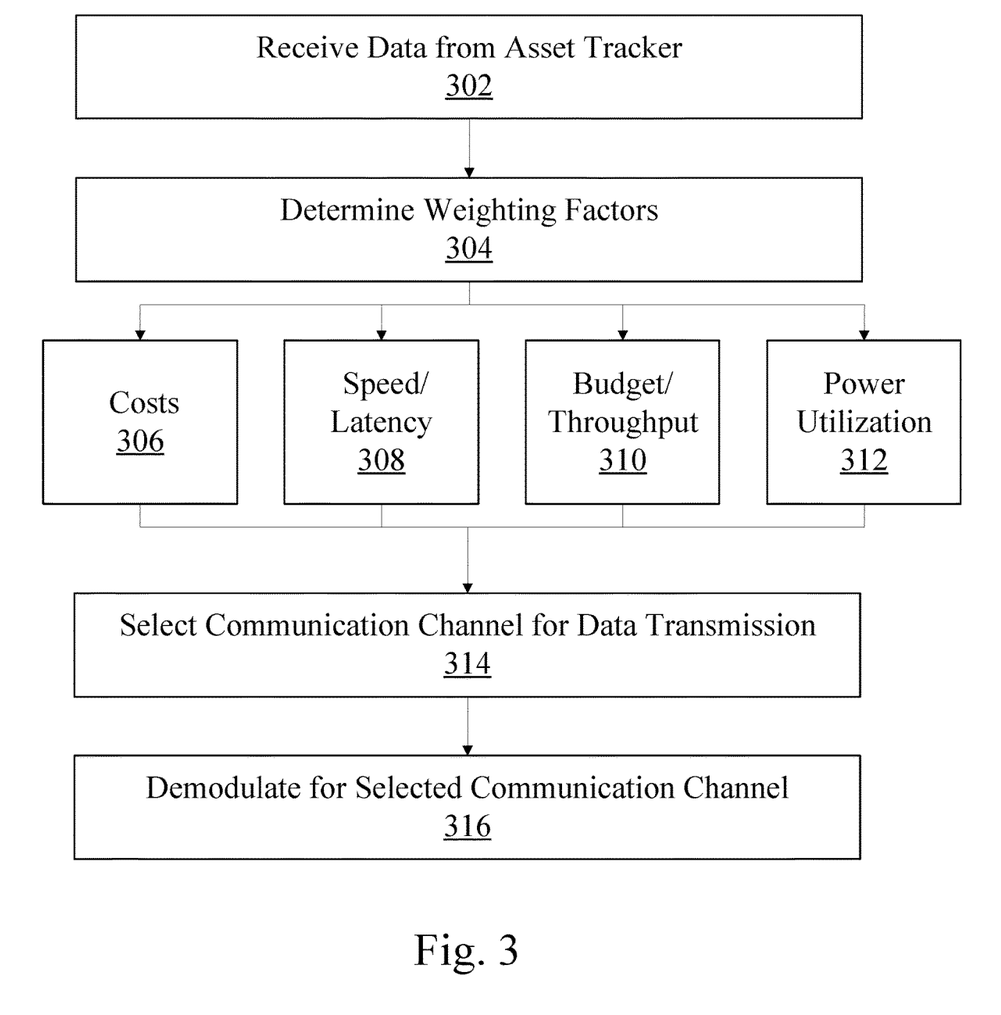
FIG. 3 illustrates a flowchart for selecting an appropriate communication channel in accordance with an exemplary embodiment of the present invention.

FIG. 3 illustrates a flowchart for selecting a communication channel in accordance with an exemplary embodiment of the present invention. In embodiments, processes for transmitting data comprise receiving data, in a memory of the server computing device, from an asset tracker device, determining, in a processor of the server computing device, one or more weighting factors representing a respective priority associated with one or more of a latency, a cost, a power utilization and a throughput associated with transmission of the data for each of a plurality of communication channels and selecting, from the plurality of communication channels, a communication channel for transmission of the data based at least in part on the one or more weighting factors and a transmission schedule for the data.

At 302, a communication request may be received. For example, the communication system 120 in FIG. 1 may receive a communication request from one of the one or more asset tracker(s) 110 in FIG. 1. The communication request may comprise a request to make data collected by the one of the one or more asset tracker(s) 110 available to a remote user, via transmission thereto. The communication request may comprise the data, in one embodiment At 304, a preliminary analysis may be performed on the data. For example, the preliminary analysis engine 214 in FIG. 2 may perform a preliminary analysis on the data. The preliminary analysis may determine priorities regarding the data. A gain (e.g., coefficient, weight, factor, etc.) may be determined and assigned to one or more of cost, latency, throughput, and/or power utilization, for transmission of the data based on the determined priorities.

At 306, a gain or weighting factor may be determined based on, and associated with, costs associated with particular channels in a plurality of communication channels. For example, the cost calculator 204 in FIG. 2 may determine a cost associated with one of the one or more cellular communication provider(s) 130 in FIG. 1 and a cost associated with one of the one or more satellite communication provider(s) 140 in FIG. 1. Cost may be based, at least in part, on a byte-wise price set by a subscription contract with a service provider, such as the one of the one or more cellular communication provider(s) 130 in FIG. 1 or the one of the one or more satellite communication provider(s) 140 in FIG. 1. The cost weighting factor as determined may reflect preference for a lower cost communication channel as compared to a higher cost channel, in embodiments, in accordance with a desired schedule for the data transmission.

At 308, a gain or weighting factor may be determined based on, and associated with, speed and/or latency associated with a plurality of communication channels may be determined. For example, the speed and/or latency calculator 206 in FIG. 2 may determine a speed and/or latency associated with the one of the one or more of the cellular communication provider(s) 130 in FIG. 1 and a speed and/or latency associated with the one of the one or more of the satellite communication provider(s) 140 in FIG. 1. Speed and/or latency may be based, at least in part, on a relevant distance. The relevant distance may comprise a distance between components of a provider's system, such as a distance between a satellite and a ground station for the one of the one or more satellite communication provider(s) 140 in FIG. 1. The relevant distance may comprise a distance between the communication system 120 in FIG. 1 or one of the one or more asset tracker(s) 110 in FIG. 1 and a component of a provider's system, such as a distance between one of the one or more asset tracker(s) 110 in FIG. 1 and a cellular tower of the one of the one or more cellular communication provider(s) 130 in FIG. 1. The relevant distance may comprise a distance between the communication system 120 in FIG. 1 and one of the one or more asset tracker(s) 110 in FIG. 1.

At 310, a gain or weighting factor may be determined based on budget and/or throughput associated with a plurality of communication channels may be determined. For example, the budget and/or throughput calculator 208 in FIG. 2 may determine a budget and/or throughput associated with the one of the one or more of the cellular communication provider(s) 130 in FIG. 1 and a budget and/or throughput associated with the one of the one or more of the satellite communication provider(s) 140 in FIG. 1. Budget and/or throughput may be based, at least in part, on an instantaneous bandwidth, such as instantaneous bandwidth of a communication channel provided by the one of the one or more cellular communication provider(s) 130 in FIG. 1 and/or the one of the one or more satellite communication provider(s) 140 in FIG. 1.

At 312, a gain or weighting factor may be determined based on power utilization associated with a plurality of communication channels may be determined. For example, the power utilization calculator 210 in FIG. 2 may determine power utilization associated with the one of the one or more of the cellular communication provider(s) 130 in FIG. 1 and power utilization associated with the one of the one or more of the satellite communication provider(s) 140 in FIG. 1. Power utilization for a particular communication channel may be based, at least in part, on a power usage of a radio associated with the particular communication channel. Power utilization for a particular communication channel may be based, at least in part, on a power needed to transition a software-defined radio (SDR) from a first configuration into a second configuration associated with the particular communication channel.

At 314, a communication channel selection may be made. For example, the decision engine 218 in FIG. 2 may make a communication channel selection between the one of the one or more cellular communication provider(s) 130 in FIG. 1 and/or the one of the one or more satellite communication provider(s) 140 in FIG. 1. The decision engine 218 may receive costs associated with a plurality of communication channels from the cost calculator 204 in FIG. 2. The decision engine 218 may receive speeds and/or latencies associated with the plurality of communication channels from the speed and/or latency calculator 206 in FIG. 2. The decision engine 218 may receive budgets and/or throughputs associated with the plurality of communication channels from the budget and/or throughput calculator 208 in FIG. 2. The decision engine 218 may receive power utilizations associated with the plurality of communication channels from the power utilization calculator 210 in FIG. 2. The decision engine 218 may receive determined gains from the preliminary analysis engine 214 in FIG. 2. The decision engine 218 may apply the gains based on priorities received from the preliminary analysis engine 214 in FIG. 2. The decision engine 218 may use the received information about the plurality of communication channels and the gains based on priorities associated with the data to select a communication channel for transmission of the data. The decision engine 218 may select the communication channel based, at least in part, on a transmission schedule determined by the offload analysis engine 216 in FIG. 2.

The decision engine 218 may cause a signal indicative of the selected communication channel to be transmitted to an asset tracker which initiated a communication request. The decision engine 218 may cause a signal indicative of the selected communication channel to be transmitted to an intermediary computing device associated with an asset tracker which initiated a communication request. The decision engine 218 may cause a signal indicative of the selected communication channel to be transmitted to a satellite. The decision engine 218 may cause a selected communication channel radio to be turned on and an unselected communication channel radio to be turned off. The decision engine 218 may cause a configuration of one or more SDR radios to be changed to a setting associated with the selected communication channel. In one embodiment, the decision engine 218 may also queue the data to be sent over a lower-cost communications channel such that the higher-cost communications channel is not used. If the queue grows over a determined threshold by the decision engine 218 (as determined by acceptable latency cost from queuing), then the decision engine 218 may toggle to the higher-cost communications channel (ensuring that transmitted data is not further delayed). In one example, an asset tracker 110 may be using LTE-M, sending data every 10 seconds. Satellite costs are considerably higher, so if the asset tracker 110 can queue 6 samples (60 seconds) and hold off from transmitting via satellite, process/system can save money even if the data is delayed for ~1 minute. The flowchart may optionally proceed to 316 when a software-defined radio (SDR) is used. In embodiments, upon selecting the communication channel, switching on the selected communication channel comprises transitioning the SDR associated with the selected communication channel from a first configuration into a second configuration.

In some variations, prior to transmitting the data via the selected channel, further embodiments can include performing an in-phase and quadrature (IQ) modulation operation driven at least in part using digital-to-analog converters. In the particular embodiment at 316, an SDR may transition to a configuration to demodulate for the selected communication channel (or may be inherently be comprised in selecting a radio). For example, the receive path SDR 122 in FIG. 1 may transition to a configuration to demodulate for the selected communication channel.

RX: A Typical RF Receive path is:
RF Signal→[HW, Antenna]→[HW, Downconvert]→[HW, I/Q Sampling]→[SW, Demodulate]→[SW, Decode]→Data
On an SDR, an RF Receive path typically uses Direct Down Conversion (DDC):
RF Signal→[HW, Antenna]→[HW, DDC]→[SW, Demodulate]→[SW, Decode]→Data
TX: A Typical RF Transmit path is:
Data→[SW, Encode]→[SW, Modulate]→[HW, Generate I/Q Waveforms]→[HW, Upconvert]→[HW, Antenna]→RF Signal
On an SDR, an TX Receive path typically uses Direct Up Conversion (DUC):
Data→[SW, Encode]→[SW, Modulate]→[HW, DUC]→[HW, Antenna]→RF Signal Generally, performance metrics may be extracted from different parts of the RX path; latency from Data (with timestamps); bit error rate/packet error rate from data and/or from the integrated circuit (IC) or SDR; strength of received signal from I/Q sampling (may be observed as receive strength sensitivity indicator (RSSI) outputted from the IC or SDR; modulation quality from Demodulate—(oftentimes observed from output from the IC or SDR); etc.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
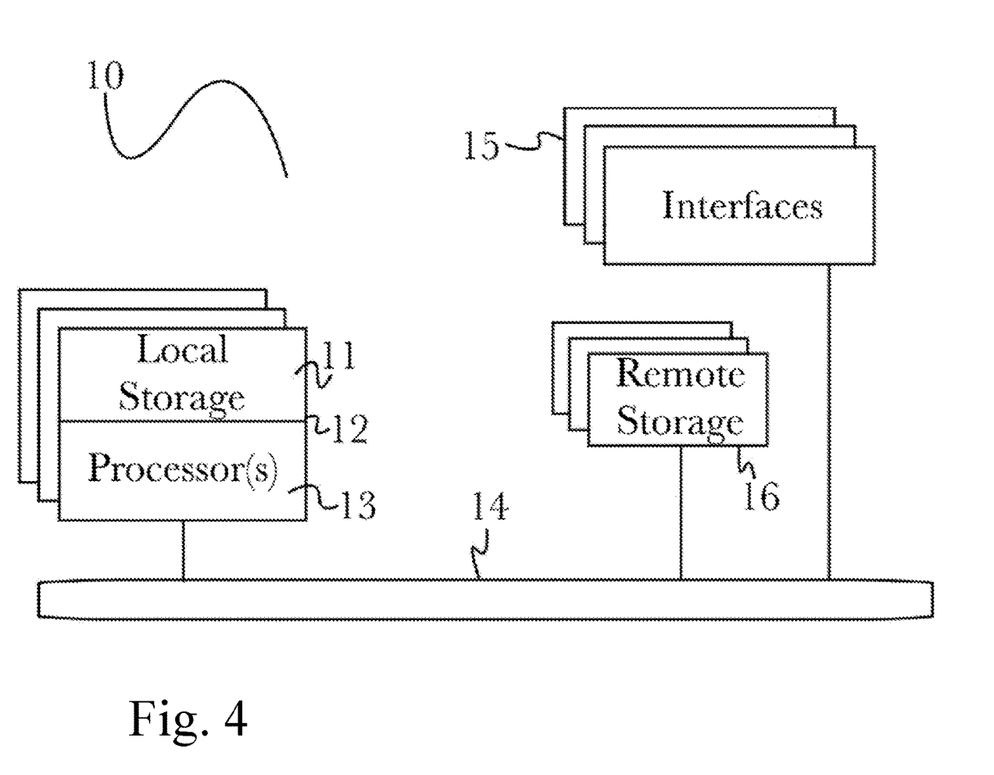
FIG. 4 illustrates an exemplary computing device that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

The computing device 10 may be and/or comprise the channel selector 126.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
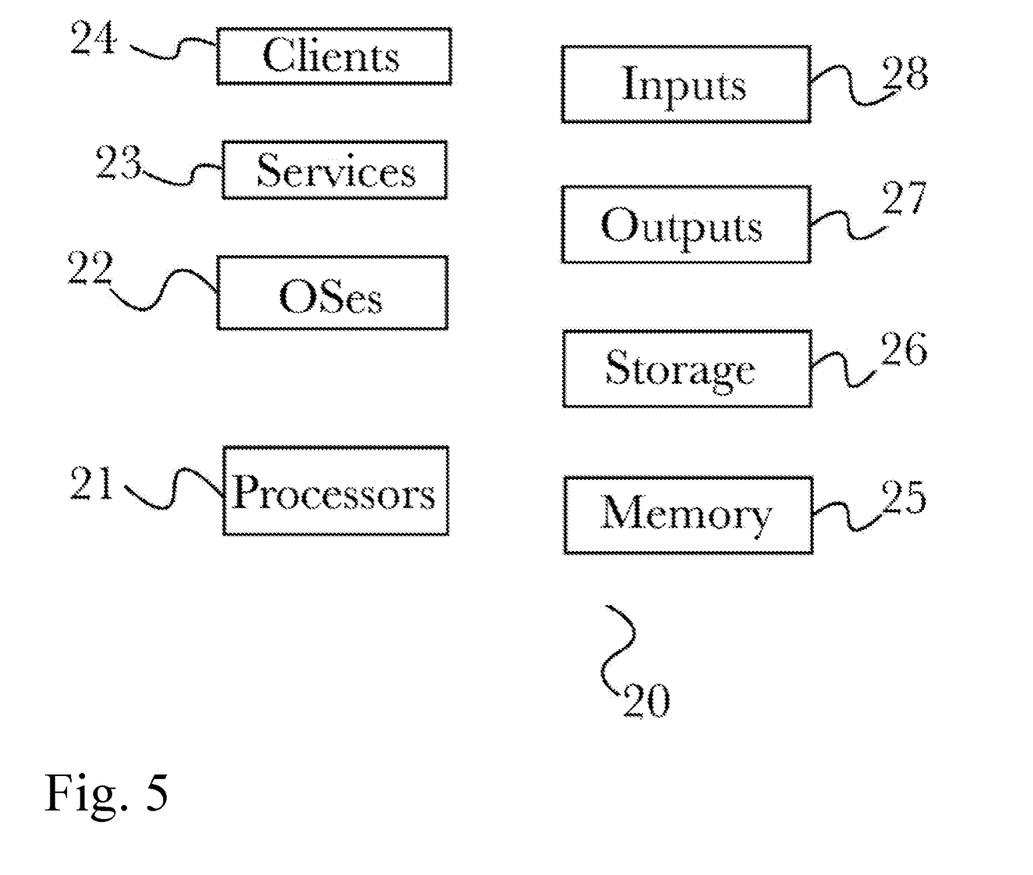
FIG. 5 illustrates an exemplary standalone computing system that supports an embodiment of the inventive disclosure.

In some embodiments, systems may be implemented on a standalone computing system. Referring now to FIG. 5 above, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

The system 20 may be and/or comprise the channel selector 126.

Figure 6:
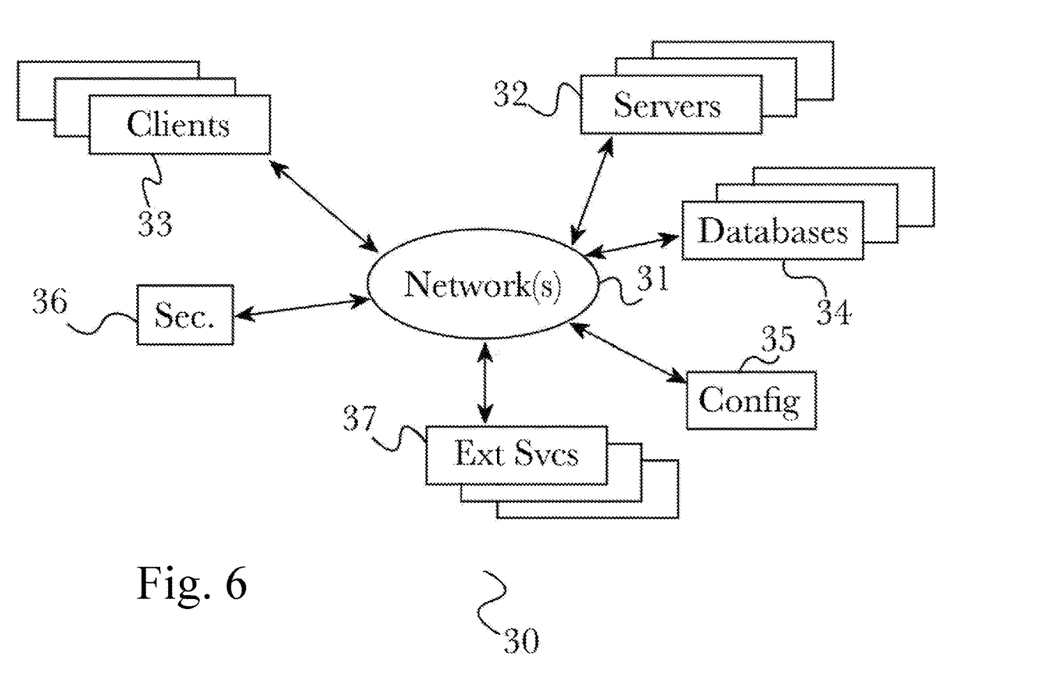
FIG. 6 illustrates on embodiment of the computing architecture that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

The one or more of the server(s) 32 may be and/or comprise the channel selector 126.

Figure 7:
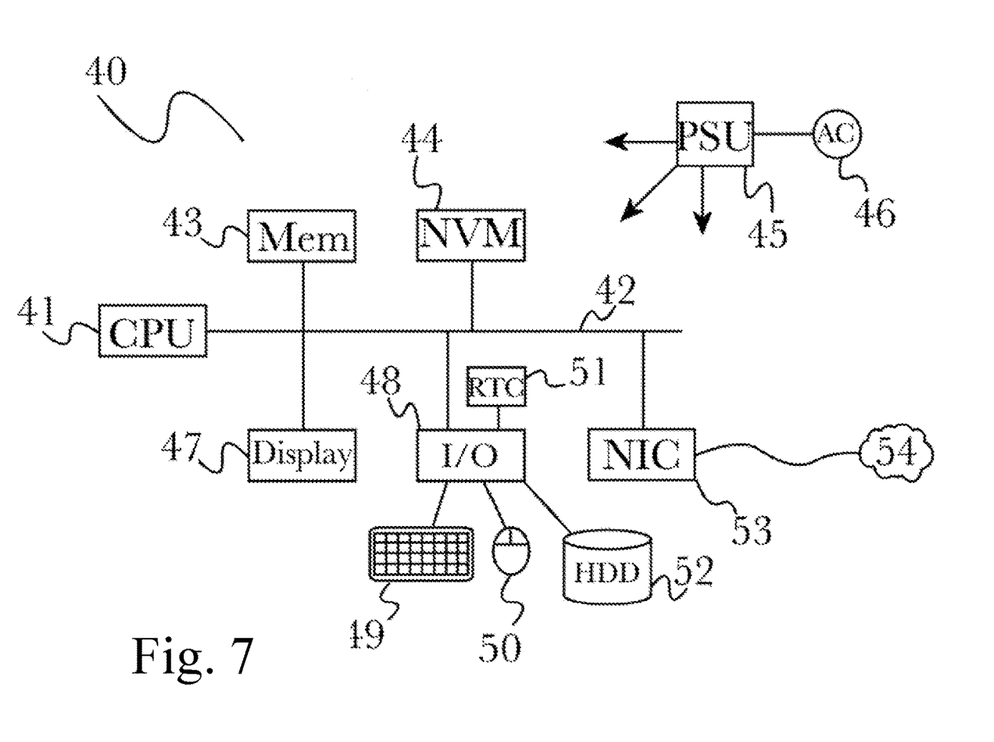
FIG. 7 illustrates an exemplary overview of a computer system that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The computer system 40 may be and/or comprise the channel selector 126.

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method, performed in a server computing device, of transmitting data, the method comprising:
receiving data, in a memory of the server computing device, from an asset tracker device;
determining, in a processor of the server computing device, one or more weighting factors representing a respective priority associated with one or more of a latency, a cost, a power utilization and a throughput associated with transmission of the data for each of a plurality of communication channels, wherein the one or more weighting factors associated with the power utilization is based at least in part upon power consumption of respective ones of the plurality of communication channels based on one or more of: a measurement, a computation, and a simulation, and wherein the power utilization of at least one of the plurality of communication channels comprises power required to transition a software-defined radio (SDR) from a first configuration into a second configuration; and selecting, from the plurality of communication channels, a communication channel for transmission of the data based at least in part on the one or more weighting factors and a transmission schedule for the data.

2. The method of claim 1 wherein the data transmission schedule is based at least in part on one or more of latency and data throughput information of each of the plurality of communication channels.

3. The method of claim 1 wherein the weighting factor associated with the latency is based at least in part upon a transmission distance associated with a location along an expected path of the asset tracker and an expected time of delivery of the data transmission.

4. The method of claim 1 further comprising:
prior to transmitting the data, queuing the data; and
transmitting the data upon toggling from the selected channel to a higher-cost communication channel when a queue length results in a predetermined unacceptable latency cost associated with the queuing.

5. The method of claim 1 wherein the selected communication channel enables transmission of the data between the asset tracker and the server computing device via at least one of: a cellular communication provider, a satellite communication provider and a wireless communication provider.

6. A method, performed in a server computing device, of transmitting data, the method comprising:
receiving data, in a memory of the server computing device, from an asset tracker device,
determining, in a processor of the server computing device, one or more weighting factors representing a respective priority associated with one or more of a latency, a cost, a power utilization and a throughput associated with transmission of the data for each of a plurality of communication channels; and
selecting, from the plurality of communication channels, a communication channel for transmission of the data based at least in part on the one or more weighting factors and a transmission schedule for the data,
switching on the selected communication channel, wherein switching on the selected communication channel comprises transitioning a software-defined radio (SDR) associated with the selected communication channel from a first configuration into a second configuration; and
transmitting the data, in accordance with the selected communication channel, to at least one of: the asset tracker, an intermediary computing device associated with the asset tracker, and a communication satellite.

7. The method of claim 6 further comprising, prior to transmitting the data, performing an in-phase and quadrature phase (IQ) modulation operation based at least in part upon IQ modulation digital to analog converters.

8. The method of claim 6, wherein the data transmission schedule is based at least in part on one or more of latency and data throughput information of each of the plurality of communication channels.

9. The method of claim 6, wherein the weighting factor associated with the latency is based at least in part upon a transmission distance associated with a location along an expected path of the asset tracker and an expected time of delivery of the data transmission.

10. The method of claim 6, further comprising:
prior to transmitting the data, queuing the data; and
transmitting the data upon toggling from the selected channel to a higher-cost communication channel when a queue length results in a predetermined unacceptable latency cost associated with the queuing.

11. The method of claim 6, wherein the selected communication channel enables transmission of the data between the asset tracker and the server computing device via at least one of: a cellular communication provider, a satellite communication provider and a wireless communication provider.

12. A server computing device comprising:
a processor; and
a memory including instructions, the instructions when executed in the processor causing operations comprising:
receiving data, in a memory of the server computing device, from an asset tracker device;
determining, in a processor of the server computing device, one or more weighting factors representing a respective priority associated with one or more of a latency, a cost, a power utilization and a throughput associated with transmission of the data for each of a plurality of communication channels, wherein the one or more weighting factors associated with the power utilization is based at least in part upon power consumption of respective ones of the plurality of communication channels based on one or more of: a measurement, a computation, and a simulation, and wherein the power utilization of at least one of the plurality of communication channels comprises power required to transition a software-defined radio (SDR) from a first configuration into a second configuration; and
selecting, from the plurality of communication channels, a communication channel for transmission of the data based at least in part on the one or more weighting factors and a transmission schedule for the data.

13. The server computing device of claim 12 wherein the data transmission schedule is based at least in part on one or more of latency and data throughput information of each of the plurality of communication channels.

14. The server computing device of claim 12 wherein the weighting factor associated with the latency is based at least in part upon a transmission distance associated with a location along an expected path of the asset tracker and an expected time of delivery of the data transmission.

15. The server computing device of claim 12 further comprising instructions executable to cause:
prior to transmitting the data, queuing the data; and
transmitting the data upon toggling from the selected channel to a higher-cost communication channel when a queue length results in a predetermined unacceptable latency cost associated with the queuing.

16. The server computing device of claim 12 wherein the selected communication channel enables transmission of the data between the asset tracker and the server computing device via at least one of: a cellular communication provider, a satellite communication provider and a wireless communication provider.

17. A server computing device comprising:
a processor; and
a memory including instructions, the instructions when executed in the processor causing operations comprising:
   receiving data, in a memory of the server computing device, from an asset tracker device;
   determining, in a processor of the server computing device, one or more weighting factors representing a respective priority associated with one or more of a latency, a cost, a power utilization and a throughput associated with transmission of the data for each of a plurality of communication channels;
   selecting, from the plurality of communication channels, a communication channel for transmission of the data based at least in part on the one or more weighting factors and a transmission schedule for the data;
   switching on the selected communication channel, wherein switching on the selected communication channel comprises transitioning a software-defined radio (SDR) associated with the selected communication channel from a first configuration into a second configuration; and
   transmitting the data, in accordance with the selected communication channel, to at least one of: the asset tracker, an intermediary computing device associated with the asset tracker, and a communication satellite.

18. The server computing device of claim 17 further comprising instructions executable to cause:
   prior to transmitting the data, performing an in-phase and quadrature phase (IQ) modulation operation based at least in part on IQ modulation digital to analog converters.

19. The server computing device of claim 17, wherein the data transmission schedule is based at least in part on one or more of latency and data throughput information of each of the plurality of communication channels.

20. The server computing device of claim 17, wherein the weighting factor associated with the latency is based at least in part upon a transmission distance associated with a location along an expected path of the asset tracker and an expected time of delivery of the data transmission.

21. The server computing device of claim 17, further comprising instructions executable to cause:
   prior to transmitting the data, queuing the data; and
   transmitting the data upon toggling from the selected channel to a higher-cost communication channel when a queue length results in a predetermined unacceptable latency cost associated with the queuing.

22. The server computing device of claim 17, wherein the selected communication channel enables transmission of the data between the asset tracker and the server computing device via at least one of: a cellular communication provider, a satellite communication provider and a wireless communication provider.

* * * * *